United States Patent [19]
Adams

[11] 3,861,764
[45] Jan. 21, 1975

[54] BEARING ASSEMBLY AND BEARING BUSHING THEREFOR

[75] Inventor: Frederick John Adams, Campton, England

[73] Assignee: Cam Gears Limited, Hitchin, Hertfordshire, England

[22] Filed: May 7, 1973

[21] Appl. No.: 358,163

Related U.S. Application Data

[63] Continuation-in-part of Ser. No. 249,629, May 2, 1972, Pat. No. 3,762,240.

[30] Foreign Application Priority Data
May 19, 1972 Great Britain.................. 23629/72

[52] U.S. Cl...................... 308/26, 308/71, 308/238
[51] Int. Cl.... F16c 23/04, F16c 25/04, F16c 27/02
[58] Field of Search............ 308/238, 26, 7, 70, 71, 308/37

[56] References Cited
UNITED STATES PATENTS
| | | | |
|---|---|---|---|
| 1,923,892 | 8/1933 | Skillman | 308/238 |
| 3,186,287 | 6/1965 | Wehlau | 308/238 |
| 3,378,316 | 4/1968 | Hotine | 308/238 |

*Primary Examiner*—M. Henson Wood, Jr.
*Assistant Examiner*—Robert Saifer
*Attorney, Agent, or Firm*—Hill, Gross, Simpson, Van Santon, Steadman, Chiara & Simpson

[57] ABSTRACT

A radial and thrust bearing for a shaft has a plastics tubular bushing composed of an axially slotted bearing ring supporting a shaft carried bearing component and connected at one end to a surrounding axially slotted thinner flexible skirt for seating in a housing to locate the bearing ring. The axial slots are circumferentially spaced, extend radially almost through the bushing with alternate inner and outer blind ends dividing the bushing into circumferential segments alternately connected at their inner and outer peripheries to accommodate radial contraction and expansion of the bushing so that wide tolerances may be permitted in the dimensions of the shaft bearing component and the housing seating. The bushing may be a continuous ring, may be a split ring, or may be composed of several discreet ring segments and the bearing ring portion thereof may be fixedly clamped in a housing.

7 Claims, 7 Drawing Figures

3,861,764

BEARING ASSEMBLY AND BEARING BUSHING THEREFOR

RELATED APPLICATION

This application is a continuation-in-part of the Frederick John Adams U.S. Pat. application Ser. No. 249,629, filed May 2, 1972, entitled, "Rack and Pinion Assembly," now U.S. Pat. No. 3,762,240 issued Oct. 2, 1973 the disclosure of which is incorporated herein by reference.

FIELD OF THE INVENTION

This invention relates to the art of shaft bearings and particularly combination radial and thrust bearings with expansible and contractible plastics bushing rings surrounded by and connected to deformable skirts for seating the rings in the housing.

PRIOR ART

Heretofore conventional shaft bearings included a bushing in the form of a cylindrical tube of phosphor bronze or the like bearing material requiring the machining of a seating for the bush and the machining of the bush itself to very accurate tolerances so that the shaft would be properly positioned in a housing or the like. Such preparation of the bushing and its seating, both on the shaft and in the housing, is time consuming and expensive.

SUMMARY OF THIS INVENTION

Shaft bearings having both radial and thrust bearing capacity are now provided with a plastics bearing bushing that is both expansible and contractible and yet rigid enough to maintain a fixed relationship of the shaft in its housing without, however, requiring expensive machining operations to bring shaft carried bearing components and the housing bearing seat within close tolerance limits. The bearing bushing of this invention is a tubular plastics member with an inner bearing ring part and an outer surrounding flexible skirt part joined together at one end, thus providing an annular gap therebetween. Axial slots extend radially through the ring, the skirt and the end wall with blind ends alternately connecting the inner and outer peripheries of circumferentially spaced segments separated by the slots. This construction affords expansion and contraction of both the ring and skirt so that the ring can accommodate wide variations in the diameters of cooperating bearing parts forming the radial and thrust bearing and the skirt can contract to accommodate variations in the size of the seating for the bearing assembly.

The inner bearing ring of the bushing has a frustoconical cross section providing tapered side faces around the inner periphery thereof to ride on opposed tapered bearing faces provided by collars or the like bearing components on the shaft. The skirt surrounding the bushing ring has a raised peripheral bead around the free end thereof to sealingly engage with the housing seating for the bearing assembly. The skirt will flex to accommodate irregularities of the bearing seating in the housing and when the proper seating is obtained, the bearing ring may be clamped in position in the housing. The skirt therefore provides flexibility in positioning the bearing assembly in the housing and the inner bearing ring of the bushing when clamped in the housing maintains the desired radial and axial position of the shaft relative to the housing and the parts in the housing.

The bearing bushing of this invention is especially useful in bearing assemblies for rack and pinion steering gear such as are disclosed and claimed in the aforesaid parent patent application Ser. No. 249,629, filed May 2, 1972.

Suitable materials for the bushing of this invention will be apparent to those skilled in this art bearing in mind the resilience, flexibility, wear resistance, low friction and the like characteristics. Engineering plastics materials such as nylon, acetal and the like resins are useful. An engineering plastics sold by Imperial Chemical Industries Limited under the Trademark "Kematal" has proved most efficient.

It is then an object of this invention to provide a bearing assembly with an expansible and contractible bearing bushing which will accommodate wide tolerance variations in shaft bearing sizes and bearing seatings and still accurately maintain a shaft in a fixed radial and axial position in a housing.

Another object of the invention is to provide an expansible and contractible plastics bearing bushing for radial and thrust bearing assemblies which will accommodate shifting of the assembly to locate a shaft in a housing and clamping of the assembly to maintain the location of the shaft.

Another object of the invention is to provide a plastics bearing bushing with a flexible surrounding skirt carrying an inner bushing ring and accommodating shifting of the ring relative to the seating for the bearing.

A further object of this invention is to improve the bearing assemblies of the aforesaid parent application Ser. 249,629, filed May 2, 1972 with an expansible and contractible plastics bearing bushing.

A still further object of the invention is to provide an inexpensive adjustable bearing bushing for radial and thrust bearings which will expand and contract to accommodate wide tolerance variations in the sizes of shaft components and bearing seatings.

Another object of the invention is to provide a plastics bearing bushing composed of connected together circumferentially spaced segments and having an inner bearing ring portion and an outer skirt portion with an annular gap therebetween.

Other and further objects of the invention will be apparent to those skilled in this art from the following detailed description of the annexed sheets of drawings which by way of preferred examples only, illustrate several embodiments of the invention.

DESCRIPTION OF THE PREFERRED EMBODIMENTS

Figure 1:
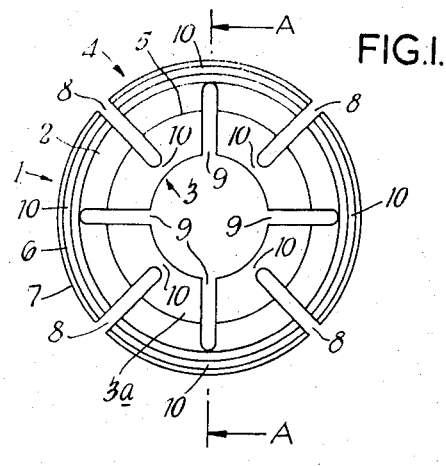
FIG. 1 is an end elevational view of a bearing bushing according to this invention.
Figure 2:
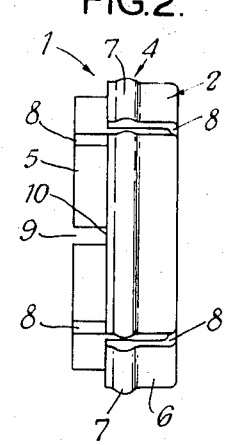
FIG. 2 is a side elevational view of the bushing shown in FIG. 1.
Figure 3:
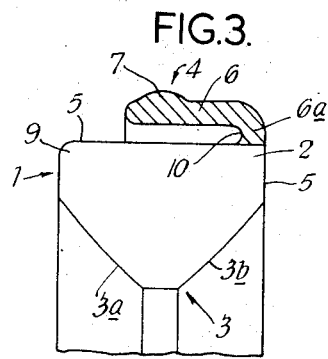
FIG. 3 is a fragmentary sectional view taken along the line A—A of FIG. 1.

As shown in FIGS. 1 to 3, the bearing bushing 1 is formed as a one-piece component in an engineering plastics material and comprises a tubular body member 2 with a radially inner bearing surface 3 and a radially outer bearing surface 4. The body member 2 has a main bearing ring 5 surrounded in spaced concentric relation by a tubular skirt 6 connected to the ring 5 at one end of the ring by a radial merging section 6a. The skirt 6 extends only partly over the ring 5, terminating in spaced relation from the left-hand end of the ring as shown in FIGS. 2 and 3. An outturned bead or rib 7 is formed around the periphery of the skirt 6 near the free end thereof. The merging portion 6a between the ring 5 and skirt 6 is considerably thinner than the cross-section of the ring 5 so that the skirt 6 and particularly its rib portion 7 is radially deformable for flexing relative to the ring 5.

The inner bearing surface 3 of the ring 5 has beveled sides 3a and 3b extending from the inner periphery of the ring toward the outer periphery and providing frusto-conical bearing walls in axially opposed relation with their smaller diameter ends located adjacent each other.

The tubular body 2 has a plurality of symmetrically disposed circumferentially spaced slots 8 and 9 extending axially through the length thereof. The slots 8 extend radially inward from the periphery of the skirt 6 through the ring 5 into spaced relation from the inner periphery of the ring. The slots 9 extend axially across the width of the ring 5 and radially outward from its inner periphery into spaced relation with the outer periphery of the skirt. Thus, as shown in FIG. 1, the slots 8 have blind ends at the inner periphery of the ring 5 while the slots 9 have blind ends at the outer periphery of the ring. Thin sections 10 radially inward from the blind ends of the slots 8 and radially outward from the blind ends of the slots 9 connect the portions separated by the slots. Thus, each slot has a depth less than the radial thickness of the tubular body 2 but has an axial length extending across the full width of the body. The slots 8 and 9 therefore separate the body 2 into a plurality of circumferentially spaced segments connected alternately by inner end portions 10 and outer end portions 10. The slots 8 are arranged in diametrically opposite pairs alternating with the slots 9 also arranged in diametrically opposite pairs. Four slots 8 and four slots 9 are illustrated.

The slotted body 2 when subjected to radially inwardly directed forces will contract by bending or hinging movements on the thin plastics sections 10 to decrease the diameter of the bushing. Conversely, if the inner bearing surface 3 is subjected to radially outwardly directed forces, the bushing will expand by hinging or bending of the connecting portions 10. Further, radially inwardly directed forces applied to the outer bearing surface 4 can cause the skirt 6 to flex radially inward relative to the main ring part 5. These slots and flexible skirt render the bushings susceptible to minor radial deformations. Since the plastics material of the bushing preferably possesses a sufficient degree of resilience, the body 5 will tend to reclaim its free state condition on removal of the deforming radially applied forces.

Figure 4:
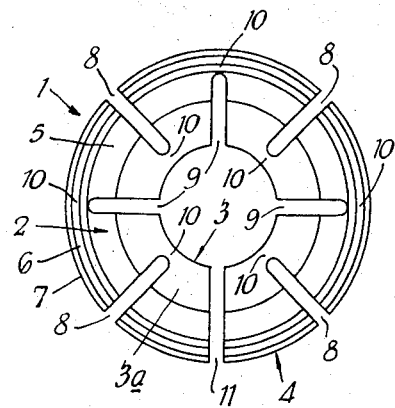
FIG. 4 is a view similar to FIG. 1 but illustrating a second embodiment of the bushing of this invention.

In the second embodiment of the invention shown in FIG. 4, parts identical with parts described in FIGS. 1 to 3 have been marked with the same reference numerals. In this FIG. 4 embodiment, however, the tubular body 8 is split as shown at 11. The split extends radially between the inner and outer bearing surfaces 3 and 4 and extends axially through the length of the bushing. This split enables the bushing to be opened up by hinged movement of the plastics section 10 which is diametrically opposite the split. Such opening up of the bushing is useful to facilitate its location on a shaft. As shown in in FIG. 4, the split 11 is located at a position in which a slot would otherwise be located and the bushing is easily formed from the bushing of FIGS. 1 to 3 by radially extending one of the slots to cut through the plastics section 10 at the bottom of that slot.

Figure 5:
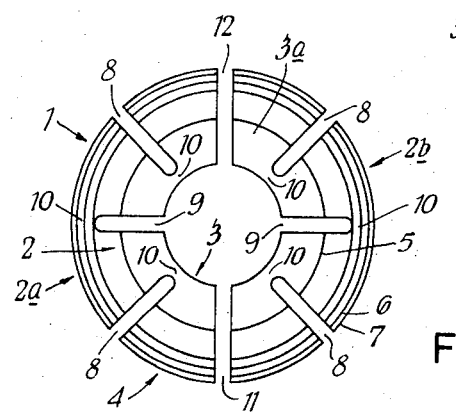
FIG. 5 is a view similar to FIG. 1 but illustrating a third embodiment of the bushing of this invention.

In the embodiment shown in FIG. 5, the same reference numerals have been used to identify identical parts. As shown in FIG. 5, the tubular body is formed by an assembly of two discreet half portions 2a and 2b. These half portions are substantially semi-circular in cross-section and when assembled in juxtaposition provides the bearing bushing with split lines 11 and 12 in diametrical alignment. The bushing of FIG. 5 is conveniently formed from the bushing of FIG. 1 by cutting through plastics sections 10 at the bottoms of two diametrically opposed slots 9. The bushing of FIG. 5 is easily assembled around a shaft and may be used under conditions where the material of the bushing or the working space available will not permit insertion of the bushings of FIGS. 1 to 4.

It will be noted in each of the three embodiments of FIGS. 1, 4 and 5, the respective slots 8 and 9, and the respective slits 11 and 12 are symmetrically disposed around the axis of the bushing with each pair of slots 9 in diametrical alignment and each pair of slots 8 in diametrical alignment except when one or more of the slots is replaced by a slit 11 or 12. This symmetrical arrangement is not essential but it is preferred as it allows for the inner and outer bearing surfaces 3 and 4 to be diametrically increased or decreased symmetrically when subjected to radially outward or radially inwardly directed forces which are applied symmetrically over the inner or outer bearing surfaces, respectively.

Figure 6:
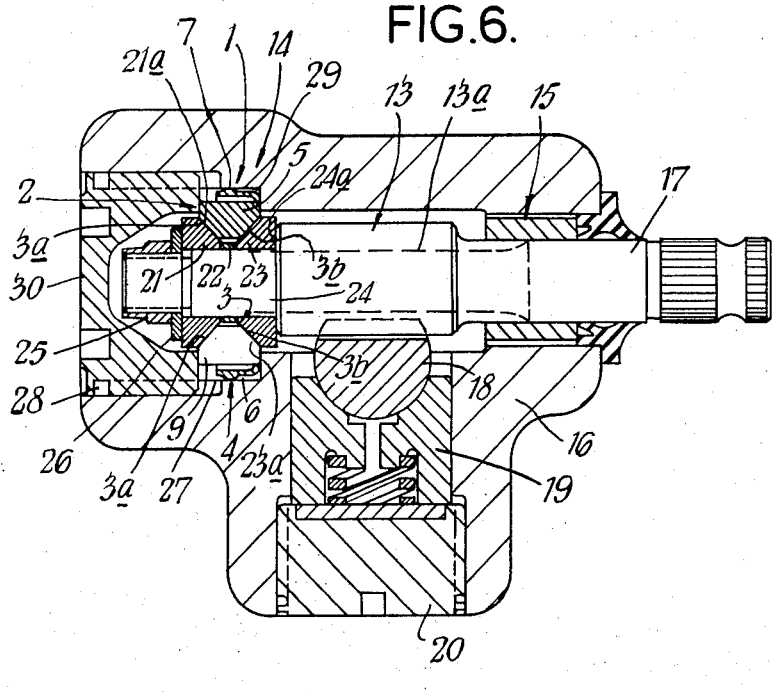
FIG. 6 is a longitudinal sectional view with parts in elevation of a rack and pinion steering gear incorporating a bearing assembly constructed according to this invention and including the bushing of FIGS. 1 to 3.
Figure 7:
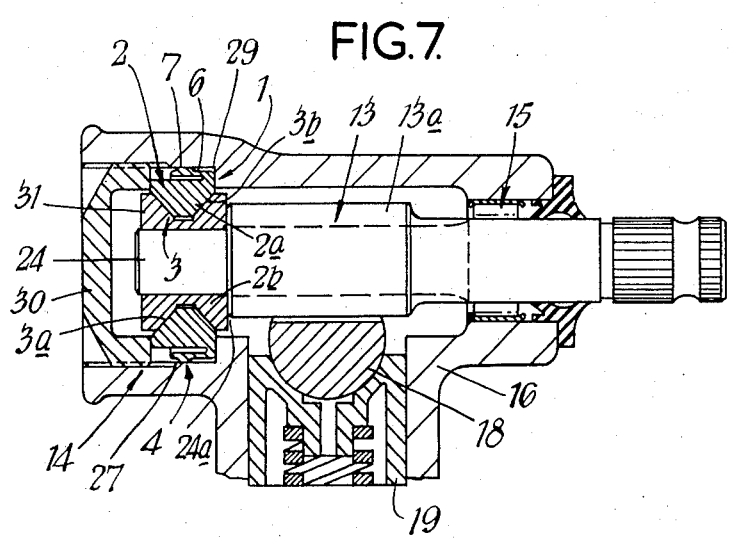
FIG. 7 is a view similar to FIG. 5 but illustrating a bearing assembly incorporating a bushing of FIGS. 4 or 5.

FIGS. 6 and 7 illustrate rack and pinion steering gear assemblies embodying a bearing assembly of this invention. As shown in these figures, a pinion 13 is rotatably mounted in axially spaced bearing assemblies 14 and 15 in a bearing housing 16. Since the rack and pinion assemblies are particularly intended for use in vehicle steering gear a cylindrical shaft part 17 of the pinion extends from the pinion housing and is axially splined to be coupled for rotation by a steering wheel or the like. The teeth 13a of the pinion mesh engage with the teeth of a rack bar 18 which is slidable longitudinally through the pinion housing 16 and is biased into engagement with the pinion 13 by a spring-loaded yoke 19 slidably mounted in a bore of the housing and retained therein by a screw threaded plug 20.

The bearing 15 is a conventional phosphor bronze or plastics bushing in which the pinion rotates and only provides radial support for the shaft part 17 of the pinion 13.

The bearing assembly 14, however, incorporates the bearing bushing 1 of the present invention and serves not only as a radial bearing for the pinion 13 in the housing 16 but also provides thrust support for locating the pinion member axially in the housing and may be clamped to radially locate the pinion 13 in the housing.

In FIG. 6, the bearing assembly comprises three annular collars 21, 22, and 23 mounted on a cylindrical shaft extension 24 of the pinion 13. These three collars are retained on the shaft extension 24 by a nut 25 acting through a washer 26 which clamps the collars against a shoulder 24a of the pinion. The collar 22 provides a predetermined axial spacing between the collars 21 and 23 and these latter collars have axially opposed frusto-conical faces 21a and 23a respectively, concentric with the pinion axis and having their respective smaller diameter ends located adjacent to each other. The collars 21 and 23 are secured to the shaft extension 24 for corotation by the clamping effect of the nut 25 and if desired, can be keyed to the shaft extension to insure corotation therewith.

Extending around the pinion member 13 and located axially between the collars 21 and 23 is the bearing bushing 1 of the embodiment shown in FIGS. 1 to 3. The bushing 1 is mounted on the shaft extension 24 prior to the collar 21, washer 26 and nut 25 are applied to the shaft extension, and has the inner bearing surface parts 3a and 3b of the bearing ring part 5 slidably engaging the frusto-conical surfaces 21a and 23a respectively.

On assembly of the bearing 14, the bearing bushing 1 is received in a bush seating provided by substantially cylindrical bore 27 in the pinion housing 16. This bore 27 is stepped down from a threaded portion 28 and the bearing bushing 1 is restrained from axial movement in the bore 27 between a radial shoulder 29 and the inner end of a screw cap 30 threaded into the housing portion 28. The bearing bushing 1 is secured against rotation and against axial shifting relative to the housing 16 by the clamping effect between the cap 30 and shoulder 29 and as a consequence, when the pinion 13 is rotated, the frustoconical surfaces 21a and 23a of the collars 21 and 23 ride on the surfaces 3a and 3b of the bushing.

It will be apparent from the foregoing description that if there are any minor irregularities in the profile of the bush seating 27 in the housing or on the shaft extension 24, then on assembly of the bearing 14 the wall of the bushing, particularly the skirt part 6, can be expanded, contracted, or flexed to accommodate a wide tolerance range in the profile of the seating surfaces of the bushing.

Should it prove necessary to adjust the tightness of the bushing 1 and its axial and radial restraining effect on the pinion member 13, it is merely necessary to replace the spacing collar 22 with a wider or narrower collar thereby causing the collars 21 and 23 to move axially toward or away from each other to displace the support 5 of the body 1 radially outward or radially inward, respectively, while the flexible skirt 6 will accommodate itself to these new sizes.

It will, of course, be understood that the spacing collar 22 may be omitted and the collars 21 and 23 retained in their axially spaced relationship solely by their abutment against the bushing 1, in which case the characteristics of the bearing assembly 14 may be adjusted by the nut 25 to change the diameter of the ring part 5.

In FIG. 7, the collars 21 to 23 have been replaced with a single collar 31 conforming in substance to the profile presented by the axially spaced surfaces 21a and 23a of the collars in FIG. 6. This collar 31 is secured for corotation with the shaft extension 24 and may be press-fit, welded, keyed or bonded to this shaft extension. Alternately, the profile of the peripheral outer surface presented by the collar 31 may be formed as an integral part of the pinion member 13.

Since it is unlikely that the material constituting the bearing bushing of the embodiment shown in FIGS. 1 to 3 will have sufficient resilience to permit it to be opened up over the collar 31, the bearing bushing in FIG. 7 will be similar to that shown in FIG. 5 with the two body ports 2a and 2b assembled around the collar prior to the pinion 13 being located in the pinion housing. The pinion member and the assembled bushing 1 are then axially inserted in the housing through the bore 27 until the outer bearing surface 4 of the bushing is located at the desired position on the bush seating 27. The cap 30 is then screwed into the housing to clamp the two wall parts 2a and 2b on the bushing 1 against the shoulder 29 of the housing.

The two part bushing in the above described assembly of FIG. 7 may be replaced by a bearing bushing similar to that shown in FIG. 4, providing that the material of the body 2 has sufficient resilience to allow the body to be opened up and located over the collar 31 between its opposed frusto-conical faces without detriment to the characteristics of the bushing material.

From the above descriptions it will therefore be understood that this invention provides a bearing assembly having both radial and thrust bearing capacity which will accommodate itself to proper seatings over a wide range of dimensional variations and will effectively locate and maintain, both axially and radially a shaft member such as a pinion member in the housing.

I claim as my invention:

1. A bearing assembly for a shaft in a housing having a bore which comprises an inner shaft carried bearing for said shaft, an outer housing carried bearing bushing in said bore of the housing surrounding said shaft carried bearing and having an inner periphery supporting the shaft carried bearing and a flexible surrounding skirt for seating in the bore of the housing, said bushing having circumferentially spaced axial slots therethrough extending radially to alternate inner and outer blind ends connecting the segments separated by the slots whereby the bushing may be expanded in response to outwardly directed forces and contracted in response to inwardly directed forces to be useful throughout a wide range of tolerance variations.

2. The bearing assembly of claim 1 wherein the shaft carried bearing has opposed tapered faces, the inner periphery of the bearing bushing has tapered faces riding on said opposed tapered faces of the shaft carried bearing, the skirt is deformed radially inwardly in said bore of the housing, and the bushing is clamped in the housing.

3. The bearing assembly of claim 1 wherein the shaft carried bearing is a pair of spaced collars rotating with the shaft, the bearing bushing is positioned between the collars with the inner periphery riding thereon and means on the shaft draw the collars toward each other to thrust against the bushing.

4. The assembly of claim 1 wherein the skirt of the bushing has an outturned bead tightly engaged in said bore of the housing.

5. A bearing bushing comprising a plastics material tube with a bearing ring part surrounded by a flexible skirt part connected at one end to said ring part, a plurality of slots extending axially through the length of said tube and radially almost through the radial thickness of the tube, said slots having alternate radially inner and radially outer blind ends providing hinged portions connecting circumferential segments separated by the slots of the ring part and the skirt part and accommodating contraction and expansion of the tube.

6. A bearing bushing comprising a generally tubular plastics body having a radially inner bearing surface, a radially outer bearing surface, a plurality of slots extending axially through the length of the body and radially almost through the radial thickness of the body, said slots being arranged in diametrically opposite pairs with one pair opening inwardly and the next pair opening outwardly and having blind ends providing hinged portions connecting the circumferential segments separated by the slots and accommodating contraction and expansion of the tubular body.

7. A bearing bushing which comprises a generally tubular plastics body having a circumferentially segmented inner bearing ring part, a circumferentially segmented flexible skirt part surrounding the bearing part in spaced concentric relation and a radial part connecting one end of the skirt part to one end of the ring part, said ring part having an inner periphery with tapered side faces providing radial and thrust bearing surfaces, and said skirt part having an outer periphery providing a seat for the bushing.

* * * * *